United States Patent [19]

Thoen et al.

[11] Patent Number: 5,089,534
[45] Date of Patent: Feb. 18, 1992

[54] PROCESS FOR PREPARING FLEXIBLE POLYURETHANE FOAM

[75] Inventors: Johan A. Thoen; Robert A. Sewell, both of Terneuzen, Netherlands; Ulrich Muller, Aachen, Fed. Rep. of Germany

[73] Assignee: The Dow Chemical Company, Midland, Mich.

[21] Appl. No.: 498,160

[22] Filed: Mar. 23, 1990

[51] Int. Cl.$^5$ .................. C08G 18/14; C08G 18/16; C08J 9/14

[52] U.S. Cl. .................. 521/106; 521/107; 521/108; 521/119; 521/131; 521/132; 521/154; 528/72; 528/108; 528/287; 528/169

[58] Field of Search .......... 521/106, 107, 108, 119, 521/131, 132, 154; 528/51, 72

[56] References Cited

U.S. PATENT DOCUMENTS

| | | | |
|---|---|---|---|
| 4,021,381 | 5/1977 | Christensen | 521/106 |
| 4,085,140 | 4/1978 | Ibbotson | 564/252 |
| 4,088,665 | 5/1978 | Findelsen et al. | 528/51 |
| 4,154,752 | 5/1979 | Sundermann et al. | 528/901 |
| 4,210,452 | 7/1980 | Nicholson et al. | 521/106 |
| 4,234,694 | 11/1980 | La Spina et al. | 521/107 |
| 4,244,288 | 1/1981 | Harasina | 101/93.02 |
| 4,273,881 | 6/1981 | Otten | 521/108 |
| 4,298,709 | 11/1981 | Ginter et al. | 521/169 |
| 4,334,944 | 6/1982 | Creye | 521/106 |
| 4,743,624 | 5/1988 | Blount | 521/106 |
| 4,859,713 | 8/1989 | Blount | 521/107 |

Primary Examiner—John Kight, III
Assistant Examiner—Duc Truong

[57] ABSTRACT

This invention relates to the use of phosphorus-containing compounds, specifically cyclic organophosphorus compounds, as carbodiimidization catalysts in the preparation of open-celled flexible polyurethane foam for the purpose of controlling foam density and providing softer foams. foams that are softer and of lower density can be prepared with significantly reduced quantities of blowing agents in comparison to foams prepared in the absence of such phosphorus-containing compounds. Additionally, use of such catalysts provides for a reduced reaction exotherm during the preparation of the foam thereby minimizing foam discoloration or scorching. Preferred phosphorus-containing compounds are the 1-alkyl-1-oxophospholenes, especially 1-methyl-1-oxophospholene.

14 Claims, No Drawings

5,089,534

PROCESS FOR PREPARING FLEXIBLE POLYURETHANE FOAM

BACKGROUND OF THE INVENTION

This invention relates to a process for preparing open-celled flexible polyurethane foam.

It is well-known to prepare open-celled flexible polyurethane foam by contacting under reaction conditions an organic polyisocyanate with a polyol in the presence of a blowing agent or blowing agent precursor.

Generally, suitable polyols are those having a hydroxyl equivalent weight of from about 800 to about 3000, and suitable polyisocyanates are the aromatic polyisocyanates such as, for example, diphenylmethane diisocyanate, toluene diisocyanate and polymeric polyphenyl polymethane polyisocyanate.

Current commercial trends are to employ a blowing agent precursor, especially water, in preference to a chlorofluorocarbon (CFC) physical blowing agent so providing for the cellular structure of the foam. CFC blowing agents, especially the fully halogenated compounds, are not favored for environmental reasons and are thought to be a contributory factor in the depletion of ozone from the earth's upper atmosphere.

Water functions as a blowing agent precursor by generating in situ the gas, carbon dioxide, through reaction with the isocyanate. The carbon dioxide provides for the cellular structure of the foam by causing the polyurethane polymer to expand.

A frequent observation when using the water/isocyanate reaction as a means of blowing to provide a foam is that the density of the resulting foam is substantially higher than might be anticipated when comparing the gaseous molar volume of the carbon dioxide theoretically produced to an equivalent molar volume of a CFC blowing agent.

A further observation is that polyurethane foams prepared where a significant amount, or all, of the blowing is provided by the water/isocyanate reaction are generally "harder" foams with inferior or undesirable physical properties, including foam discoloration brought about by the increased reaction exotherm of foam preparation in the presence of water.

The observation of increasing foam "hardness" and discoloration is seen in systems where the polyisocyanate is a toluene diisocyanate. Foams prepared with systems where the polyisocyanate consists essentially of 4,4'-diphenylmethane diisocyanate (4,4'-MDI) additionally suffer from the problem of higher densities as already mentioned.

To overcome the problem of higher densities with 4,4'-MDI systems, it is known in the art to prepare foams where the 4,4'-MDI has been blended with quantities, up to 50 weight percent of 2,4'-MDI prior to preparing the foam. Such resulting foams have a lower density for a given quantity of blowing agent/precursor and improved physical properties including "softness". The increase in the "softness" character of the foam is thought to be obtained by reducing the ability of the polymer morphology to develop hard centers of crystallinity. However, the isomer 2,4'-MDI is in relatively short supply and, therefore, is not a commercially attractive route to providing foams.

It is therefore desirable to provide a process for preparing open-celled, flexible, polyurethane foam in the presence of predominantly the blowing agent precursor, water, which overcomes or at least minimizes the problems of foam "hardness", discoloration and higher densities independently of the type of isocyanate employed.

To this purpose, we have investigated the use of phosphorus-containing compounds as catalysts in a process for preparing a flexible polyurethane foam.

The use of phosphorus-containing compounds, particularly those identified as promoting the formation of carbodiimide groups when preparing rigid, hard, polyurethane-modified polyisocyanate foams is known. Publications such as, for example, U.S. Pat. Nos. 3,645,923; 3,717,596; 3,740,709; 3,806,475 and 3,981,829 describe the use of certain phosphorus-containing compounds to enhance properties such as compressive strengths, fire retardancy and reduce friability of rigid foams.

Similarly, the use of certain phosphorus-containing compounds to modify and provide liquid storage-stable polyisocyanates is known and described in, for example, U.S. Pat. Nos. 3,449,256; 3,640,966; 3,670,502; 4,085,146; 4,088,665 and 4,424,288. To modify and provide storage-stable polyisocyanates, the phosphorus-containing compound is typically employed in only from about 1.0 to about 100 ppm by weight of isocyanate. To ensure the storage stability of the resulting polyisocyanate, the phosphorus-containing compound must either be deactivated and/or removed, or at least be inactive at the common storage temperatures of isocyanates.

SUMMARY OF THE INVENTION

It has now been found that phosphorus-containing compounds promoting formation of carbodiimide groups can advantageously be employed in the preparation of flexible polyurethane foams in the presence of water. The use of such compounds in the preparation of the foam unexpectedly provides for foams of lower density for a given quantity of blowing agent, enhanced "softness" properties of the foam and further minimizes foam discoloration by reducing the observed reaction exotherm.

In a first aspect, this invention is a process for preparing a flexible polyurethane polymer comprising contacting under reaction conditions an organic polyisocyanate with a polyol in the presence of water and a catalyst characterized in that the catalyst comprises at least one component that is a phosphorus-containing compound.

In a second aspect, this invention is an isocyanate-reactive composition suitable for preparing a flexible polyurethane polymer characterized in that it comprises (a) at least one polyol component that is a polyether polyol having a hydroxyl equivalent weight of from about 800 to about 3000 and a mole average of from about 2 to about 4 isocyanate active hydrogen atoms, and (b) from at least 0.05 and up to about 5.0 weight percent based on the total weight of polyol of a cyclic phosphorus-containing compound represented by one or more of the formulae

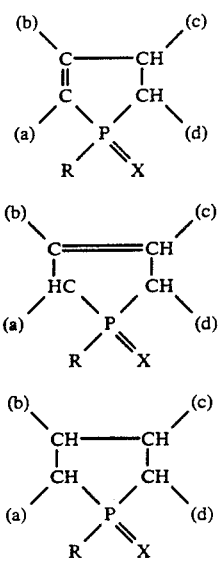

wherein a, b, c and d each independently represent hydrogen, a halogen, a $C_{1-6}$ alkyl radical, a $C_{1-6}$ alkenyl radical, phenyl, a cycloalkyl radical, or a polymethylene group which together with two neighboring carbon atoms of the heterocyclic phosphorus-containing ring forms a cycloaliphatic ring, where R represents hydrogen, a $C_{1-6}$ alkyl radical, a $C_{1-6}$ alkenyl radical, phenyl or an alkoxy radical, and where X represents oxygen or sulfur.

In a third aspect, this invention is a flexible polyurethane foam having an overall density of from about 6 to about 200 kg/M³ prepared from a reaction mixture comprising an organic polyisocyanate, a polyol, water and a catalyst characterized in that the catalyst comprises a cyclic phosphorus-containing compound represented by one or more of the formulae

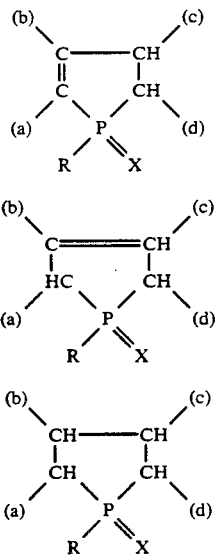

wherein a, b, c and d each represent hydrogen, a halogen atom, a $C_{1-6}$ alkyl radical, a $C_{1-6}$ alkenyl radical, phenyl, a cycloalkyl radical, or a polymethylene group which together with two neighboring carbon atoms of the heterocyclic ring forms a cycloaliphatic ring, R represents a $C_{1-6}$ alkyl radical, a $C_{1-6}$ alkenyl radical, a phenyl radical, an alkoxy radical or a hydrogen atom and X represents oxygen or sulfur.

DETAILED DESCRIPTION OF THE INVENTION

The catalyst used in the process of this invention for preparing an open-celled, flexible polyurethane polymer from the reaction of an organic polyisocyanate with a polyol is one which comprises at least one component that is recognized as promoting the formation of carbodiimide linkages within the polymer. Such linkages are provided by the, generally endothermic, reaction of one isocyanate group with a second isocyanate group accompanied by the generation of carbon dioxide. The endothermic reaction can be a convenient heat-sink for the concurrently occurring exothermic reactions when preparing a polyurethane polymer. Such a heat-sink can help reduce scorching and discoloration within resulting polyurethane polymers especially flexible polyurethane foam. The resulting carbodiimide linkage may be readily observed by analytical techniques such as, for example: infrared spectroscopy where they have a strong absorption band of typically about 2130 cm$^{-1}$ for aromatic-associated carbodiimide linkages. The isocyanate absorption band for aromatic isocyanates is typically about 2270 cm$^{-1}$.

Components which promote the formation of carbodiimide linkages in a polyisocyanate-based polymer will hereinafter be referred to as carbodiimidization catalysts.

In this present invention, substances promoting the formation of carbodiimide linkages are phosphorus-containing compounds, preferably organo-phosphorus-containing compounds, and more preferably cyclic organo-phosphorus-containing compounds. Such cyclic compounds are represented by one or more of the formulae:

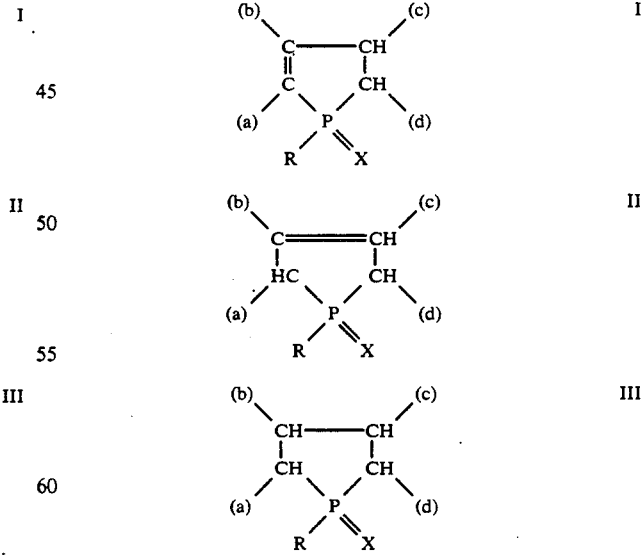

wherein a, b, c and d each represent hydrogen, a halogen atom, a $C_{1-6}$ alkyl radical, a $C_{1-6}$ alkenyl radical, phenyl, a cycloalkyl radical, or a polymethylene group which together with two neighboring carbon atoms of the heterocyclic ring forms a cycloaliphatic ring, R represents a $C_{1-6}$ alkyl radical, a $C_{1-6}$ alkenyl radical, a phenyl radical, an alkoxy radical or a hydrogen atom and X represents oxygen or sulfur.

Especially preferred cyclic organo-phosphorus-containing compounds for use in the process of this invention are those where X represents oxygen and R represents hydrogen or a $C_{1-6}$ alkyl radical such as, for example, methyl, ethyl, propyl and the like.

Exemplary of such cyclic organo-phosphorus carbodiimidization catalysts are 1-methyl-1-oxophospholene, 1-ethyl-1-oxophospholene, 1-butyl-1-oxophospholene, 1-(2-ethylhexyl)-1-oxophospholene, 1-methyl-1-thiophospholene, 1-(2-chloroethyl)-1-oxophospholene, 1-phenyl-1-oxophospholene, 1-p-tolyl-1-oxophospholene, 1-chloromethyl-1-oxophospholene, 1,3-dimethyl-1-oxophospholene, 1,2-dimethyl-1-oxophospholene, 1-methyl-3-chloro-1-oxophospholene, 1-methyl-3-bromo-1-oxophospholene, 1-chlorophenyl-1-oxophospholene, 1,3,4-trimethyl-1-oxophospholene, 1,2,4-trimethyl-1-oxophospholene, 1,2,2-trimethyl-1-oxophospholene, 1-phenyl-1-thiophospholene, 1-phenyl-3-methyl-1-oxophospholene, 1-phenyl-2,3-dimethyl-1-oxophospholene, mixtures thereof and the like.

Especially preferred catalysts for use in the process of this invention because of availability and compatibility with polyurethane-forming compositions include the isomers of 1-methyl-1-oxophospholene, 1-ethyl-1-oxophospholene, 1-propyl-1-oxophospholene, or mixtures thereof.

The above phospholene compounds and methods for their preparation are described in U.S. Pat. Nos. 2,663,737; 2,663,738; 2,663,739; 2,853,473; and 2,941,966 the disclosures of which are herein incorporated by reference. The catalysts when prepared are generally obtained as a mixture of isomers, such a mixture can be separated to provide pure isomer material, or equally the isomer mixture can be employed in the process of the invention. Although the different isomers probably exhibit a different degree of catalytic activity, it is convenient to use the cheaper and more readily available isomeric mixtures.

The 3-phospholene compounds (formula II) can be isomerized readily to the corresponding 2-phospholene compounds (formula I) by thermal treatment or by heating under reflux conditions with an aqueous base as disclosed by Quinn et al., *Journal of the American Chemical Society*, Vol. 33, p. 1024 (1968).

The above mentioned carbodiimidization catalysts can be used alone or in combination with other carbodiimidization catalysts which may be non-phosphorus-containing compounds.

Other carbodiimidization catalysts that may additionally be used in the process of this invention include polymer-bound phospholene oxide products as disclosed in U.S. Pat. Nos. 4,105,642 and 4,105,643; diaza- and oxazaphospholanes and -phosphorinanes as disclosed in U.S. Pat. No. 3,522,303; phosphate esters as disclosed in U.S. Pat. No. 3,056,835; phosphine oxides; triaryl arsines and triaryl arsine oxides as disclosed in U.S. Pat. Nos. 3,406,198 and 4,143,063; metallic derivatives of acetylacetone such as the beryllium, aluminum, zirconium, chromium and iron such as disclosed in U.S. Pat. No. 3,152,131; nitrogenous compounds as disclosed in U.S. Pat. No. 4,814,359; all incorporated herein by reference.

When preparing polyurethane polymers, especially open-celled flexible polyurethane foam, the carbodiimidization catalyst is used in a catalytic quantity sufficient to promote the formation of carbodiimide linkages within the polymer, providing for a product with acceptable physical properties including softness, and in the case of flexible foams especially those prepared from diphenylmethane diisocyanates provide for a lower density foam. Advantageously, the phosphorus-containing compound is present in a quantity up to about 5.0, preferably up to about 4.0 and more preferably up to about 3.0 weight percent based on total weight of polyol(s) reacting with the polyisocyanate. Advantageously, the quantity of phosphorus-containing compound present is at least 0.05, preferably at least 0.1 and more preferably at least 0.2 weight percent based on total weight of polyol(s) reacting with the polyisocyanate.

Suitable organic polyisocyanates for use in the process of this invention include aromatic and homologues or higher polymeric adducts thereof, aliphatic and cycloaliphatic polyisocyanates and combination thereof. By "homologues" of aromatic polyisocyanates it is understood those containing 2 or 3 aromatic rings and by "higher" polyisocyanates those containing at least 4 aromatic rings. Representative examples are diisocyanates such as m-phenylene diisocyanate, 2,4-toluene diisocyanate, 2,6-toluene diisocyanate, mixtures of 2,4-toluene diisocyanate and 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 2,4'-diphenylmethane diisocyanate, 4,4'-diphenylmethane diisocyanate and mixtures, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate.

Polyisocyanates and prepolymers thereof, including those modified prior to reacting with the polyol may also be employed. Especially useful, and preferred, due to their availability and properties are the aromatic polyisocyanates including the toluene diisocyanates, 4,4'-diphenylmethane diisocyanate, 2,4'-diphenylmethane diisocyanate and polymethylene polyphenyl polyisocyanate, commonly referred to as "crude MDI", and prepolymers thereof. The preferred polyisocyanates can be used alone or in combinations when being reacted with the polyol.

The polyisocyanate reacting with the polyol is present in such a quantity to provide a ratio of isocyanate groups to each active hydrogen atom present, including those of the polyol and any other compounds present containing active hydrogen atoms, such as for example water, of from about 0.7:1 to about 2.0:1, preferably from about 0.8:1 to about 1.5:1, and more preferably from about 0.85:1 to about 1.3:1.

The polyol used in the process of the invention is a polyol or a polyol composition comprising at least one component having an average hydroxyl equivalent weight of from about 800 to about 3000, preferably from about 1000 to about 2500, and more preferably from about 1000 to about 2000. Advantageously, such polyol has a molar average of from about 2 to about 8, preferably from about 2 to about 6, and more preferably from about 2 to about 4 active hydrogen atoms per molecule.

Suitable polyols include polyester polyols and preferably are polyether polyols.

Exemplary of suitable polyether polyols are those prepared by polymerizing an alkylene oxide such as, for example, ethylene oxide, 1,2-propylene oxide, 1,2- or 2,3-butylene oxide or mixtures thereof, with an initiator containing from 2 to 8, preferably from about 2 to about 6 and more preferably from about 2 to about 4, active hydrogen atoms per molecule in the presence of an alkoxylation catalyst. Examples of initiators suitable for the preparation of such products include water, alkylene glycols such as ethylene glycol and propylene glycol, glycerine, trimethyolpropane, pentaerythritol, sorbitol, sucrose, bis 2,2-(4-hydroxyphenyl) propane, aniline, ethanolamine, ethylenediamine, N(1-aminoethyl)-piperazine, alkoxylated adducts thereof, and mixtures thereof.

Suitable processes for the preparation of polyether polyols have been disclosed by Wurtz in 1859, *The Encyclopaedia of Chemical Technology*, Vol. 7, pp. 257–266, published by Interscience Publishers Inc. (1951), and U.S. Pat. No. 1,922,459.

Polyether products which are preferred include the alkylene oxide adducts of trimethyolpropane, glycerine, propylene glycol and blends thereof having average hydroxyl equivalent weights of from about 800 to about 3000.

When open-celled flexible polyurethane foams are prepared by the process of the invention a blowing agent is present. The blowing agent is present in such a quantity so as to provide a resulting foam which has an overall density of from 6 to about 200, preferably from about 10 to about 100, and more preferably from about 12 to about 80 $Kg/M^3$.

In the process of this invention, the preferred blowing agent for the preparation of the polyurethane foam is carbon dioxide generated from the reaction of water with isocyanate. Theoretically, one mole of water leads to the generation of one mole carbon dioxide. Advantageously, the carbon dioxide is present in an amount to provide from at least 50, preferably at least 60 and more preferably at least 75, and up to 100 percent of the total blowing requirement for obtention of foams having the desired densities.

To provide such blowing requirement, water is present in the process of this invention in an amount of from about 1.0, preferably from about 2.0 and more preferably from about 2.5, and up to about 10.0, preferably up to about 8.0 and more preferably up to about 6.0 weight percent based on total weight of polyol present. When water does not provide for 100 percent of the blowing requirement in preparing the polyurethane foam by the process of this invention, the remaining requirement can be furnished by the additional use of a physical blowing agent(s).

Suitable physical blowing agents for preparing the polyurethane foam by the process of the invention are those organic compounds having a boiling point of from about −40° C. to about 90° C. and include the chlorinated and/or the fluorinated hydrocarbons such as tetrafluoromethane, bromotrifluoromethane, chlorotrifluoromethane, dibromodifluoromethane, dichlorodifluoromethane, trichlorofluoromethane, hexafluoroethane, 1,2,2-trichloro-1,1,2-trifluoroethane, 1,1,2,2-tetrachloro-1,2-difluoroethane, 1,2-dibromo-1,1,2,2-tetrafluoroethane, 1,2,2-tribromo-1,1,2-trifluoroethane, octafluoropropane, decafluorobutane, hexafluorocyclopropane, 1,2,3-trichloro-1,2,3-trifluorocyclopropane, octafluorocyclobutane, 1,2-dichloro-1,2,3,3,4,4-hexafluorocyclobutane, 1,2,3,4-tetrachloro-1,2,3,4-tetrafluorocyclobutane, dichlorotrifluoroethane, dichlorofluoroethane, trichloroethylene, trichloroethane, chloroform, dichloromethane, carbon tetrachloride and low boiling hydrocarbons including alkanes or alkenes such as butane, pentane, and hexane or mixtures thereof.

Advantageously when reacting the organic polyisocyanate with the polyol, the phosphorus-containing compound promoting formation of the carbodiimide linkage is used in admixture with other catalysts, such as isocyanate trimerization catalysts and especially catalysts which promote the formation of the urethane linkage. A urethane linkage within a polyurethane polymer is the result of reacting an isocyanate with an active hydrogen-containing compound such as a polyol.

Suitable catalysts for use in admixture with the phosphorus-containing compound are the urethane-promoting catalysts including, for example amine catalysts, especially tertiary amines, such as triethylenediamine, N-methylmorpholine, N-ethylmorpholine, triethylamine, 2-methyltriethylenediamine, mixtures thereof, and the like. Also organotin compounds such as, for example, stannous octoate, stannous oleate, stannous laurate, dibutyltin dilaurate, dibutyltin di-2-ethylhexoate and dibutyltin dibutoxide can be employed to promote the formation of the urethane linkage. Advantageously, combinations of amine catalysts and organotin compounds can be employed to provide for optimum foam properties, characteristics.

The optimum concentration of the urethane catalysts required, especially the organotin catalyst must be determined experimentally. Optimum concentrations and ranges for the organotin catalyst will depend on a number of factors including the reactivity of the polyol and/or the polyol composition and the isocyanate. Generally, inherently higher reactivity systems will require less catalyst. Typically the concentration of the organotin catalyst is from about 0.05 to 3.0, and preferably from 0.05 to 2.0 parts by weight per 100 parts by weight of total weight of all polyol present for reacting with the polyisocyanate.

Optionally, the reaction mixture comprising polyisocyanate and polyol may contain other components and additives. Representative of such additives include surfactants, fire-retardant agents, fillers, dyes, pigments, anti-oxidizing agents, fungicides and the like. Cross-linking agents used to modify foam properties can also be incorporated on the reaction mixture. Representative of cross-linking agents are alkylamines, diamines, glycerine, diethanolamine and other similar low molecular weight compounds containing at least two, and preferably at least 3 active hydrogen atoms per molecule.

Exemplary of surfactants, which may be present to stabilize or control cell size, are alkoxysilanes, polysilylphophonates, polydimethylsiloxànes, the condensates of ethylene oxide with a hydrophobic base formed by condensing propylene oxide with propylene glycol, the alkylene oxide adducts of ethylenediamine, and the polyoxyalkylene esters of long chain fatty acids and sorbitan, and (siloxaneoxyalkylene) block copolymers. Preferred of such materials are the siloxaneoxyalkylene block copolymers. Such block copolymers are described in U.S. Pat. Nos. 2,834,748; 2,917,480; 3,505,377; 3,507,815; 3,563,924 and 4,483,894.

Examples of suitable surfactants are the "Tegostab" products Tegostab B-4113, B-4380, and B-8681 sold by Goldschmidt and the surfactant DC-5043, sold by Dow Corning Corporation. Examples of suitable stabilizers are Tegostab BF-2270, BF-2370, BF-4900 and B-3136 sold by Goldschmidt and the Dow Corning Corporation products DC-190 and DC-198. Generally, such additives are employed in amounts of advantageously from about 0.05 to about 5.0 and preferably of from about 0.1 to about 2.0, parts by weight per one hundred parts of total weight of all polyol present.

Suitable processes for the preparation of polyurethane polymers are discussed in U.S. Pat. Nos. RE 24514, 3,821,130, and G.B. Patent 1,534,258. Suitable equipment, material and processes for the preparation of polyurethane polymers is further discussed by J. H. Saunders and K. C. Frisch in "Polyurethanes Chemistry and Technology," Volumes I and II, R. E. Krieger Publishing Company, Inc., ISBN 0-89874-561-6.

Generally, flexible foams can be prepared in a one-step process by reacting all the ingredients together at once or alternatively, foams can be made by the so-called "quasi-prepolymer method." In the one-shot process, where foaming is carried out in machines, the active hydrogen-containing products, catalysts, surfactants, blowing agents and optional additives may be introduced through separate pipes to the mixing head where they are combined with the polyisocyanate to give the polyurethane-forming mixture. The mixture may be poured or injected into a suitable container or mold as required. For use of machines with a limited number of component lines into the mixing head, a premix of all the components except the polyisocyanate (and blowing agent when a gas is used) to give a polyol formulation, can be advantageously employed. This simplifies the metering and mixing of the reacting components at the time the polyurethane-forming mixture is prepared.

Alternatively, the foams may be prepared by the so-called "quasi-prepolymer method". In this method a portion of the polyol or another polyol component is reacted with the polyisocyanate component in proportion so as to provide, for example when using a diphenylmethane diisocyanate, from about 10 percent to about 30 percent of free isocyanato groups in the reaction product based on the weight of prepolymer. To prepare a foam, the remaining portion of the polyol or another polyol is added and the components are allowed to react together in the presence of catalysts and other appropriate additives such as blowing agent, surfactant, etc. Other additives may be added to either the prepolymer or remaining polyol or both prior to the mixing of the components, whereby at the end of the reaction a flexible polyurethane foam is provided.

The polyurethane polymers prepared by the process of this invention are useful in a variety of application areas. Areas include flexible slabstock and molded foam and carpet backing. Micro-cellular polyurethane polymers may also be prepared including elastomers suitable for use as coatings, moldings, and shoe soles.

MATERIALS AND TEST PROCEDURES

The following designated materials are used in the examples given to illustrate the invention.

Voranol TM CP-6001-a glycerine-initiated oxypropylene/-oxyethylene polyether polyol, hydroxyl equivalent weight 2000, sold by The Dow Chemical Company Voranol TM CP-4711-a glycerine-initiated oxypropylene/-oxyethylene polyether polyol, hydroxyl equivalent weight 1570, sold by The Dow Chemical Company Voranol TM CP-3040-a glycerine-initiated oxypropylene/-oxyethylene polyether polyol, hydroxyl equivalent weight 1020, sold by The Dow Chemical Company Niax TM A-1-70 percent bis-(dimethylamino)ether, 30 percent dipropylene glycol, sold by Union Carbide Niax TM C174-a proprietary blend of amine catalysts sold by Union Carbide Dabco TM 33LV-33 percent solution of triethylenediamine in dipropylene glycol sold by Air Products Tegostab TM B2370-B4113 and B8681, silicone surfactants sold by Th Goldschmidt Ag Dabco TM T-9-stannous octoate solution sold by Air Products Thermolin TM -101-a flame-retardant additive sold by Olin Isocyanate A-(i) 70 percent by weight methylene diphenylisocyanate (4,4'-, 2,4'-isomer 90:10); (ii) 30 percent by weight polymeric polyphenyl polyisocyanate (2 ring content approximately 40 percent)

Isocyanate B-(i) 80 percent by weight methylene diphenylisocyanate (4,4'-, 2,4'-isomer 90:10); (ii) 20 percent by weight polymeric polyphenyl polyisocyanate (2 ring content approximately 40 percent)

Isocyanate C-an isocyanate-terminated prepolymer prepared from 4,4'-methylene diphenylisocyanate and a poly(oxypropylene) diol which is then back-blended with polymethylene polyphenyl polyisocyanate. Prepolymer has an isocyanate content of 25 weight percent The following test procedures are used to observe the physical properties of the foams as reported in the examples.

| Test | Standard Method |
|---|---|
| Tear Strength | DIN53515 |
| Tensile strength and elongation | DIN53571 |
| Compression load deflection (CLD) SAG factor, Hysteresis' | DIN53577 |
| Resilience | ASTM D3574.81 |
| Indentation load deflection (ILD) (25%, 40%, 65%) and modulus | DIN53576 |

ILLUSTRATIVE EMBODIMENTS

The following examples are given to illustrate the invention and should not be interpreted as limiting it in any way. Unless stated otherwise, all parts and percentages are given by weight.

EXAMPLE 1

In this example the use of 1-methyl-1-oxophospholene (MPO) to control the free-rise density of foams prepared with different aromatic polyisocyanates is demonstrated.

Foams are prepared according to the following formulations. Isocyanate type, reaction index and quantity of MPO employed are given in Table I along with the free-rise density of the resulting foam.

| Formulation I: | |
|---|---|
| Voranol TM CP-6001 | 100 parts by weight |
| Dabco 33LV | 0.5 part by weight |
| Niax A-1 | 0.05 part by weight |

-continued

| | |
|---|---|
| Tegostab B-2370 | 0.1 part by weight |
| Tegostab B-4113 | 0.2 part by weight |
| Diethanolamine | 2.0 parts by weight |
| Water | 3.5 parts by weight |
| Formulation II: | |
| Voranol TM CP-6001 | 100 parts by weight |
| Dabco 33LV | 0.12 part by weight |
| Niax A-1 | 0.04 part by weight |
| Tegostab B-8681 | 0.2 part by weight |
| Diethanolamine | 0.8 part by weight |
| Thermolin-101 | 2.0 parts by weight |
| Dabco T-9 | 0.2 part by weight |
| Water | 2.5 parts by weight |

Comparative Foam Examples A and B are manufactured using formulations prepared without the addition of MPO.

TABLE I
Control of Foam Density with MPO

| Foam | Formulation | MPO (pphp)[1] | Isocyanate Type/Index[2] | Free-Rise Density (Kg/M³) |
|---|---|---|---|---|
| A* | I | — | A/100 | 42.44 |
| 1 | I | 0.5 | A/100 | 40.74 |
| 2 | I | 1.0 | A/100 | 39.87 |
| 3 | I | 1.5 | A/100 | 37.86 |
| 4 | I | 2.0 | A/100 | 37.12 |
| 5 | I | 2.5 | A/100 | 35.58 |
| B* | II | — | C/100 | 75.4 |
| 6 | II | 0.5 | C/100 | 71.5 |
| 7 | II | 1.0 | C/100 | 62.0 |
| 8 | II | 1.5 | C/100 | 55.9 |
| 9 | II | 2.0 | C/100 | 52.5 |
| 10 | II | 2.5 | C/100 | 51.0 |

*Not an example of this invention
[1] pphp-parts per hundred parts polyol
[2] Index-100 is equivalent to a 1.0:1 NCO/OH ratio From Table I it can be clearly seen how when preparing foams with a constant quantity of water present, that the addition of MPO allows for preparation of foams having reduced free-rise densities.

The density reduction obtained is significant in the respect that such density foams can now be obtained without the need to use additional quantities of physical blowing agents or blowing agent precursors.

EXAMPLE 2

Molded foams are prepared according to Formulation I of Example 1.

The isocyanate type, index, quantity of MPO and resulting foam physical properties are given in Table II.

Molded foams are prepared with varying degrees of mold over-packing. A higher molded density indicates a greater degree of over-packing.

In Table II, certain foams are characterized by a guide factor value. A lower value indicates a foam that has "softer" properties. The guide factor value is calculated according to the following formula:

$$\frac{\text{Load Bearing Ability (kPa)}}{\text{Foam Density (kg/m}^3\text{)}} \times 10.$$

wherein load bearing ability is represented by compression load deflection at 40 percent or by indentation load deflection at 40 percent.

TABLE II
Physical Properties of Molded Foams Prepared in the Presence of MPO

| Foam | 11 | 12 | 13 | 14 | 15 | 16 | 17 | 18 | 19 | C* | D* | E* |
|---|---|---|---|---|---|---|---|---|---|---|---|---|
| MPO (pphp) | 1.0 | 1.0 | 1.0 | 1.0 | 1.0 | 1.0 | 2.0 | 2.0 | 2.0 | 0 | 0 | 0 |
| I/I[1] | A/110 | A/110 | B/110 | B/110 | B/100 | B/100 | B/100 | B/100 | B/100 | A/110 | A/100 | A/90 |
| MD[2] (kg/m³) | 39.7 | 38.1 | 45.5 | 40.2 | 45.8 | 41.1 | 43.0 | 39.9 | 35.0 | 45.3 | 45.1 | 45.0 |
| ILD 40% (N) | 210 | 187 | 295 | 205 | 280 | 190 | 210 | 185 | 110 | 415 | 310 | 245 |
| Elon[3] (%) | 92 | 90 | 95 | 89 | 100 | 95 | 98 | 98 | 100 | 76 | 94 | 108 |
| Res[4] (%) | 53 | 53 | 50 | 53 | 41 | 53 | 44 | 49 | 53 | 54 | 56 | 58 |
| Hyst[5] (%) | 22 | 22 | 24 | 24 | 23.5 | 20.5 | 21 | 19.5 | 18.5 | 26 | 24 | 21.5 |
| TS[6] (kPa) | 124 | 119 | 130 | 100 | 132 | 113 | 103 | 106 | 89 | 182 | 158 | 158 |
| Guide Factor | 5.3 | 4.9 | 6.5 | 5.1 | 6.1 | 4.6 | 4.9 | 4.6 | 3.14 | 9.16 | 6.9 | 5.44 |

*Not an Example of this invention
[1] Isocyanate/Index
[2] Molded density of foam
[3] Elongation
[4] Resilience
[5] Hysteresis
[6] Tensile strength

EXAMPLE 3

The Following foams are prepared according to Formulation III.

Table 3 gives the quantities of MPO, catalyst, water and isocyanate type and index employed. The physical properties of the resulting foams are also given in Table III.

| Formulation III: | |
|---|---|
| Voranol TM CP-4711 | 100 parts by weight |
| Tegostab TM B-4113 | 0.4 parts by weight |
| Niax TM C-174 | 0.6 parts by weight |

TABLE III
Indicated quantities are parts by weight per 100 parts polyol

| Foam | 20 | 21 | 22 | F* | 23 | 24 | 25 | G* | H* | J* |
|---|---|---|---|---|---|---|---|---|---|---|
| MPO (parts) | 3.0 | 3.0 | 3.0 | — | 3.0 | 3.0 | 3.0 | — | — | — |
| Water | 3.5 | 3.5 | 3.5 | 3.5 | 1.5 | 1.5 | 1.5 | 1.5 | 1.5 | 1.5 |
| Dabco 33LV | 0.4 | 0.4 | 0.4 | 0.4 | 0.8 | 0.8 | 0.8 | 0.8 | 0.8 | 0.8 |
| I/I[1] | C/100 | C/120 | C/200 | C/100 | C/120 | C/140 | C/200 | C/80 | C/120 | C/140 |

TABLE III-continued

| Foam | Indicated quantities are parts by weight per 100 parts polyol | | | | | | | | | |
|---|---|---|---|---|---|---|---|---|---|---|
|  | 20 | 21 | 22 | F* | 23 | 24 | 25 | G* | H* | J* |
| FMD [2] (kg/m³) | 37.4 | 31.6 | 26.3 | 54.1 | 62.0 | 54.1 | 48.8 | 86.2 | 69.1 | 70.0 |
| CLD [3] 40% (kPa) | 1.51 | 1.65 | 3.45 | 2.95 | 2.16 | 2.16 | 2.84 | 3.21 | 5.05 | 6.98 |
| Guide Factor | 0.40 | 0.52 | 1.31 | 0.55 | 0.35 | 0.40 | 0.58 | 0.37 | 0.73 | 1.00 |

*Not an Example of this invention
[1] Isocyanate/Index
[2] Free-rise density
[3] Compressive Load Deflection Comparison of the data presented in Table III for essentially identical systems indicates that foams prepared in the presence of the phosphorus-containing compound in addition to having a reduced overall density are also significantly softer foams as evidenced by the lower guide factor value.

Reduction of foam density is significant at reaction indices greater than 100 as is to be expected as more isocyanate is available to form carbodiimide linkages as opposed to reacting with active hydrogen atoms present.

EXAMPLE 4

This example illustrates the use of the phosphorus-containing compound (MPO) in preparing foams where the polyisocyanate is toluene diisocyanate. Toluene diisocyanate is generally recognized in the art as being more reactive with water than the diphenylmethane diisocyanates.

Foams are prepared according to Formulation IV with properties of resulting foams being indicated in Table IV.

| Formulation IV: | |
|---|---|
| Voranol ™ CP-3040 | 100 parts |
| Dimethylethanolamine | 0.12 parts |
| Tegostab ™ BF-2370 | 1.3 parts |
| Niax ™ A-1 | 0.06 parts |
| Water | 4.5 parts. |
| Toluene diisocyanate Index 100 80:20 (2,4-/2,6-isomer) | |

Quantities of MPO and T-9 catalyst employed to provide equivalent air flows are also reported in Table IV.

TABLE IV

| Foam | 26 | 27 | 28 | K* |
|---|---|---|---|---|
| MPO parts | 0.5 | 1.0 | 1.5 | — |
| T-9 parts | 0.20 | 0.17 | 0.17 | 0.20 |
| Density (kg/m³) | 23.41 | 23.07 | 22.4 | 23.9 |
| % Density Reduction [1] | 1.8 | 3.7 | 6.3 | — |
| CLD 40% (kPa) | 3.13 | 2.34 | 2.17 | 3.58 |
| % CLD reduction [1] | 12.6 | 34.6 | 39.3 | — |
| Guide Factor | 1.33 | 1.02 | 0.98 | 1.5 |
| % Reduction [1] Guide Factor | 11.3 | 32 | 34.6 | — |

*Not an example of the invention
Parts are parts per 100 parts polyol in the formulation
[1] % reduction is relative to the comparative foam sample, K

EXAMPLE 5

Foams are prepared according to the formulation as in Example 4. The foams are prepared using hand mix conditions and the resulting reaction exotherm monitored.

| MPO (pphp) | Reaction Exotherm (°C.) |
|---|---|
| 0 | 143 |
| 1.0 | 139 |
| 2.0 | 121 |

Addition of MPO to the polyurethane-forming mixture results in a lower reaction exotherm. This is significant as foam discoloration, scorching due to high reaction exotherm temperatures may now be minimized by the process of this invention.

EXAMPLE 6

A similar series of foams as prepared in Example 4 but having a higher density are prepared, the quantity of water employed in the formulation is 3.5 parts by weight, BF-2370 is 1.0 part and Niax A-1 is 0.08 part. Results are shown in Table V.

TABLE V

| Foam | 29 | 30 | L* |
|---|---|---|---|
| MPO parts | 0.5 | 1.0 | — |
| T-9 parts | 0.20 | 0.13 | 0.16 |
| Density (kg/m³) | 29.2 | 28.5 | 29.8 |
| % Density Reduction | 2.0 | 4.2 | — |
| CLD 40% (kPa) | 2.95 | 2.34 | 3.28 |
| % CLD reduction | 10.0 | 28.6 | — |
| Guide Factor | 1.01 | 0.82 | 1.10 |
| % Reduction Guide Factor | 8.2 | 25.5 | — |

*Not an example of the invention

Examples 4 to 6 illustrate further the density control, enhanced softness properties and reduction of reaction exotherm and thereby foam discoloration of the foam obtainable when prepared in the presence of a phosphorus-containing compound, such as 1-methyl-1-oxo-phospholene.

What is claimed is:

1. A process for preparing a flexible polyurethane foam comprising contacting under reaction conditions an organic polyisocyanate with a polyol in the presence of water and a catalyst characterized in that the catalyst comprises at least one component that is a phosphorus-containing compound present in from at least 0.05 and up to about 5.0 weight percent based on the total weight of polyol reacting with the polyisocyanate and represented by at least one of the formulae

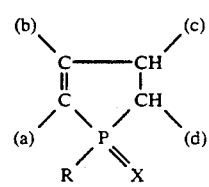

I

-continued

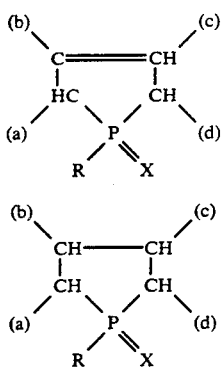

wherein a, b, c and d each independently represent hydrogen, a halogen, a $C_{1-6}$ alkyl radical, a $C_{1-6}$ alkyl radical, phenyl, a cycloalkyl radical, or a polymethylene group which together with two neighboring carbon atoms of the heterocyclic phosphorus-containing ring forms a cycloaliphatic ring; wherein X is oxygen and wherein R is hydrogen or a $C_{1-6}$ alkyl radical.

2. The process as claimed in claim 1 wherein the cyclic phosphorus-containing compound 1-methyl-1-oxophospholene, 1-ethyl-1-oxophospholene, 1-propyl-1-oxophospholene, isomers thereof and mixtures thereof.

3. The process as claimed in claim 2 wherein the phosphorus-containing compound is used in admixture with a urethane-promoting catalyst.

4. The process as claimed in claim 1 wherein the phosphorus-containing compound is present in from at least 0.2 and up to about 3.0 weight percent based on the total weight of polyol reacting with the polyisocyanate.

5. The process as claimed in claim 1 wherein the polyol comprises a polyether polyol having a hydroxyl equivalent weight of from about 800 to about 3000 and a mole average of from about 2 to about 4 isocyanate active hydrogen atoms.

6. The process as claimed in claim 5 wherein the organic polyisocyanate is an aromatic polyisocyanate which is present in an amount so as to provide from about 0.7 to about 2.0 isocyanate groups for each active hydrogen atom present of the polyol including water present.

7. The process as claimed in claim 6 wherein the water is present in from about 1.0 to about 10.0 weight percent based on total weight of polyol present.

8. The process as claimed in claim 6 wherein the organic polyisocyanate is an aromatic polyisocyanate which is present in an amount so as to provide from about 0.85 to about 1.3 isocyanate groups for each active hydrogen atom present.

9. The process as claimed in claim 6 wherein the aromatic polyisocyanate consists essentially of diphenylmethane diisocyanate.

10. The process as claimed in claim 6 wherein the aromatic polyisocyanate consists essentially of toluene diisocyanate.

11. The process as claimed in claim 9 wherein the diphenylmethane diisocyanate is present in an amount to provide from about 0.85 to about 1.3 isocyanate groups for each active hydrogen atom present, and wherein the diisocyanate is contacted under reaction conditions with a polyether polyol having an equivalent weight of from about 1000 to about 2500 and a mole average of from about 2.0 to about 4.0 active hydrogen atoms in the presence of from about 2.0 to about 8.0 weight percent of water based on total weight of polyol present, and form at least 0.2 and up to about 3.0 weight percent, based on total weight of polyol present of a cyclic phosphorus-containing compound which is 1-methyl-1-oxyphospholene, 1-ethyl-1-oxophospholene, 1-propyl-1-oxophospholene, isomers thereof and mixtures thereof.

12. The process as claimed in claim 10 wherein the toluene diisocyanate is present in an amount to provide from about 0.85 to about 1.3 isocyanate groups for each active hydrogen atom present, and wherein the diisocyanate is contacted under reaction conditions with a polyether polyol having an equivalent weight of from about 1000 to about 2500 and a mole average of from about 2.0 to about 4.0 active hydrogen atoms in the presence of from about 2.0 to about 8.0 weight percent of water based on total weight of polyol present, and form at least 0.2 and up to about 3.0 weight percent, based on total weight of polyol present of a cyclic phosphorus-containing compound which is 1-methyl-1-oxyphospholene, 1-ethyl-1-oxophospholene, 1-propyl-1-oxophospholene, isomers thereof and mixtures thereof.

13. An isocyanate-reactive composition suitable for preparing a flexible polyurethane polymer characterized in that it comprises
(a) at least one polyol component that is a polyether polyol having a hydroxyl equivalent weight of from about 800 to about 3000 and a mole average of from about 2 to about 4 isocyanate active hydrogen atoms, and
(b) from at least 0.05 and up to about 5.0 weight percent based on the total weight of polyol of a cyclic phosphorus-containing compound represented by the formulae

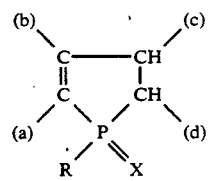

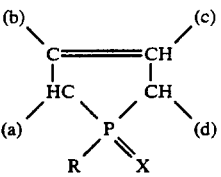

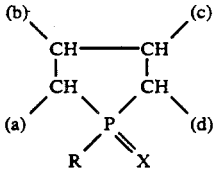

wherein a, b, c and d each independently represented hydrogen, a halogen, a $C_{1-6}$ alkyl radical, a $C_{1-6}$ alkenyl radical, phenyl, a cycloalkyl radical, or a polymethylene group which together with two neighboring carbon atoms of the heterocyclic phosphorus-containing ring forms a cycloaliphatic ring, where R represents hydrogen or a $C_{1-6}$ alkyl radical and where X represents oxygen.

14. A flexible polyurethane polymer having an overall density of from about 6 to about 200 Kg/M$^3$ prepared from a reaction mixture comprising an organic polyisocyanate, a polyol, water and a catalyst characterized in that the catalyst comprises a cyclic phosphorus-containing compound represented by one or more of the formulae

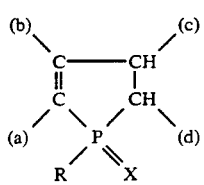   I

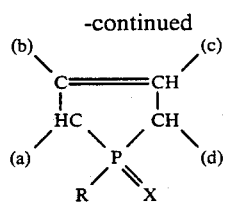   II

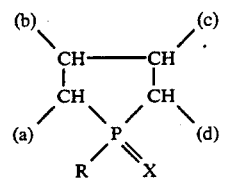   III wherein a, b, c and each independently represent hydrogen, a halogen, a $C_{1-6}$ alkyl radical, a $C_{1-6}$ alkenyl radical, phenyl, a cycloalkyl radical, or a polymethylene group which together with two neighboring carbon atoms of the heterocyclic phosphorus-containing ring forms a cycloaliphatic ring, where R represents hydrogen or a $C_{1-6}$ alkyl radical and where X represents oxygen.

* * * * *